United States Patent
Gilbert et al.

(10) Patent No.: US 7,725,025 B2
(45) Date of Patent: May 25, 2010

(54) SWITCHABLE FIBER TERMINATION

(75) Inventors: Thomas M. Gilbert, New Gloucester, ME (US); Jeremy E. Parsons, Myersville, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 833 days.

(21) Appl. No.: 11/481,993

(22) Filed: Jul. 6, 2006

(65) Prior Publication Data

US 2008/0008417 A1    Jan. 10, 2008

(51) Int. Cl.
*H04B 10/08* (2006.01)
(52) U.S. Cl. ............................... 398/16; 398/12; 398/19
(58) Field of Classification Search .................. 398/12, 398/16, 19–21, 30, 45
See application file for complete search history.

(56) References Cited

U.S. PATENT DOCUMENTS

| | | | |
|---|---|---|---|
| 7,315,668 B1 * | 1/2008 | Mahony | 385/14 |
| 2006/0198634 A1 * | 9/2006 | Ofalt et al. | 398/16 |
| 2007/0109974 A1 * | 5/2007 | Cutillo et al. | 370/254 |
| 2007/0133424 A1 * | 6/2007 | Brolin et al. | 370/249 |
| 2007/0280695 A1 * | 12/2007 | Li et al. | 398/135 |

* cited by examiner

Primary Examiner—Dzung D Tran

(57) ABSTRACT

An apparatus, system and method are provided for a switchable fiber termination (SFT) incorporated into an optical network device that responds to a test signal received via an optical network carrying data. The test signal may be a part of a multiplexed signal carrying data and is separated from the data by a wavelength division multiplexer. The SFT may be used to determine the characteristics of an optical network, including the operational status of optical network devices.

21 Claims, 6 Drawing Sheets

SWITCHABLE FIBER TERMINATION

BACKGROUND INFORMATION

Technological advancements such as the Internet, video on demand, high-definition television (HDTV), video conferencing, multiple telephone lines, etc. and the need or desire for better quality video and audio have created the demand for more and more bandwidth at businesses and homes. In response to this demand, telecommunications providers and others began installing fiber optic telecommunications cables with extremely large bandwidths to replace or supplement traditional copper and coaxial systems. Fiber-optic cable is known in the art to one of ordinary skill and is generally comprised of a plurality of fiber-optic strands and buffering material encased in one or more layers of shielding material. Initially, because of the cost of fiber optic cable, head-end equipment and terminating equipment, the fiber optic cable was extended only to large businesses and local exchange panels where service to small business, homes and other residential dwellings was still occurring through copper wires. However, bandwidth demand has continued to grow and costs of fiber-optic cable and equipments has decreased and consequentially, telecommunications providers and others have begun to install fiber optic cable all the way to small businesses, homes and other residential dwellings. This is generally referred to as fiber to the premises (FTTP).

In many instances, passive optical networks (PONs) are used to provide FTTP as well as fiber to the curb (FTTC) and fiber to the neighborhood (FTTN). PON is a fiber to the premises configuration in which unpowered optical splitters are used to enable a single optical fiber to serve multiple premises. The advantages to PON include that it is a fiber-based transmission network that contains no active electronics and that a single fiber may provide service to multiple premises. It is a point-to-multipoint configuration, which reduces the amount of fiber required compared with point-to-point configurations. However, the very design that makes PONs attractive from a design and cost standpoint creates challenges when testing a PON, especially when the PON is on-line or active. Prior technologies have used a moveable mirror to selectively reflect light back into a fiber for test purposes. However, these devices reflect the light at all wavelengths back onto the fiber. This allows the fiber to be tested by an instrument at the other end of the fiber, but this test cannot be made without disrupting traffic on the fiber. Also, these devices have not been designed to work in PONs. Instead they have been used in point-to-point fiber networks or Fiber Distributed Data Interface (FDDI) networks (e.g., token ring).

DETAILED DESCRIPTION OF PREFERRED EMBODIMENTS

Figure 1:
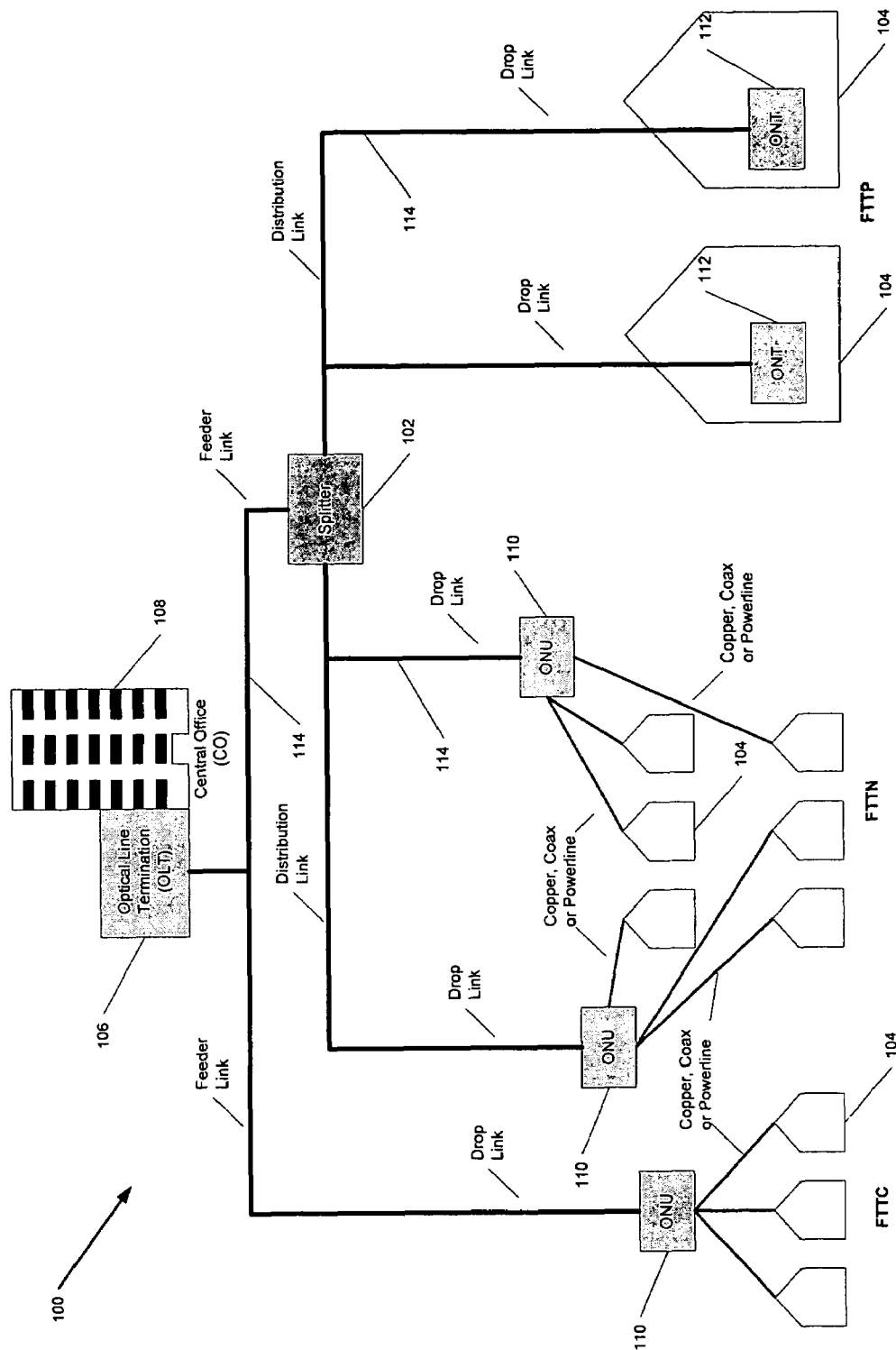
FIG. 1 is an exemplary passive optical network (PON) used for the transport of data.

The preferred embodiments implemented according to the present invention now will be described more fully with reference to the accompanying drawings, in which some, but not all possible embodiments of the invention are shown. Indeed, the invention (as recited by the claims appended hereto) may be embodied in many different forms and should not be construed as limited to the embodiments set forth herein. Rather, these embodiments are provided so that this disclosure will satisfy applicable legal requirements. Like numbers refer to like elements throughout.

The preferred embodiments (or portions thereof) may be implemented as a method, a data processing system, or a computer program product. Accordingly, an embodiment may take the form of an entirely hardware embodiment, an entirely software embodiment, or an embodiment combining software and hardware aspects. Furthermore, implementations of the preferred embodiments may take the form of a computer program product on a computer-readable storage medium having computer-readable program instructions (e.g., computer software) embodied in the storage medium. More particularly, implementations of the preferred embodiments may take the form of web-implemented computer software. Any suitable computer-readable storage medium may be utilized including hard disks, CD-ROMs, optical storage devices, or magnetic storage devices.

The preferred embodiments according to the present invention are described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

A preferred embodiment according to the present invention provides a switchable fiber termination (SFT) that may be utilized as an enhancement to optical network terminations (ONTs), optical network units (ONUs) and other optical network devices in optical networks, including passive optical networks (PONs). The SFTs allow these devices to be commanded to respond to a signal received by the SFT. Generally, the SFT responds by temporarily reflecting light received on a single wavelength back into the fiber toward a test head. In other embodiments, the signal may be reproduced by the SFT and re-inserted back into the network. The test head may be located at a central office (CO) or any other location where test head can be located such as a remote terminal (RT) location. In a preferred embodiment, the test head is a PON test head and is comprised of an optical time-domain reflectometer (OTDR).

In one preferred embodiment, the commanding of the optical network devices to insert or remove the response (e.g., reflection) can be accomplished by imbedded commands that are initiated by, for example, an optical network device's element manager system (EMS), or by a light wave pattern initiated by the test head. The wavelength of the signal used to evoke a response from the SFT is chosen so that it is distinct from, and does not interfere with, voice, video, or data traffic that may be carried on the fiber optic cable that comprises the optical network.

The SFT allows an OTDR located as part of the PON test head to inject a test signal at the chosen wavelength into a network fiber, selectively enable the SFT at one of the optical devices (e.g., ONTs) connected to the fiber, and measure the characteristics of the distribution link and connector of the selected device. For example, the preferred embodiments of the SFT allow the following functions to be performed while an optical fiber is carrying normal traffic: (1) automated testing of distribution and drop links; (2) a centrally located test head can selectively test the individual distribution and drop links that connect to a single feeder link in an optical network; (3) a centrally located test head can identify the separate distribution and drop links connected to a single feeder link when two or more distribution and drop links are the same length (without the SFT device, such a test head or instrument can only analyze the combined characteristics of multiple distribution and drop links that are of the same length); (4) physical layer confirmation that an ONT or other optical network device is at least partially operational and powered on without requiring the device's transmit laser to be operational, thus allowing the failure of the device's transmit laser to be identified; (5) signal loss in an ONT's or other optical network device's fiber connector may be identified and quantified therefore enabling an end-to-end (test head to inside the device) signal loss measurement including the device's connector loss.

FIG. 1 is an exemplary passive optical network (PON) 100 used for the transport of voice, video and data traffic (generally referred to herein as "data"). Exemplary PON 100 is a point-to-multipoint fiber to the premises (FTTP) network architecture in which unpowered optical splitters 102 are used to enable a single optical fiber to serve multiple premises 104. PON 100 consists of an optical line termination (OLT) 106 at the service provider's central office 108 and a number of optical network units (ONUs) 110 and optical network terminations (ONTs) 112 near or at end-users.

PON 100 takes advantage of wavelength division multiplexing (WDM), using one or more wavelengths for downstream traffic and other wavelengths for upstream traffic. Optical network devices such as ONUs 110 and ONTs 112 are comprised of one or more wavelength-division multiplexers, among other components, that separate or combine signals of various wavelengths. This allows for two-way traffic on a single fiber optic cable. Generally, the latest specification calls for downstream traffic to be transmitted on the 1490 nanometer (nm) wavelength and upstream traffic to be transmitted at 1310 nm. The 1550 nm band is generally used for video in case the service provider wishes to share the PON fiber with a hybrid fiber-coax (HFC) network, which is the traditional cable TV architecture.

PON 100 is comprised of a central office node, called an optical line terminal (OLT) 106, one or more user nodes, called optical network terminals (ONT) 112 and optical network units (ONU) 110, and the fibers 114 and splitters 102 between them, which collectively may be referred to as the optical distribution network (ODN). The OLT 106 provides the interface between the PON 100 and a backbone network, while ONUs 110 and ONTs 112 provide the service interface to end users. These services can include voice (plain old telephone service (POTS) or voice over IP (VoIP)), data (typically Ethernet or V.35), video, and/or telemetry (TTL, ECL, RS530, etc.). A PON 100 is a converged network, in that many or all of these services are converted and encapsulated in a single packet type for transmission over the PON fiber.

PON 100 is a shared network, in that the OLT 106 sends a single stream of downstream traffic that is seen by all ONUs 110 and ONTs 112. Each ONU 110 or ONT 112 only reads the content of those packets that are addressed to it. Encryption is used to prevent unauthorized snooping of downstream traffic. The OLT 106 also communicates with each ONU 110 and ONT 112 in order to allocate upstream bandwidth to each node. When an ONU 110 or ONT 112 has traffic to send, the OLT 106 assigns a timeslot in which the ONU 110 or ONT 112 can send its packets. Because bandwidth is not explicitly reserved for each ONU 110 or ONT 112, but allocated dynamically, a PON 100 allows statistical multiplexing and oversubscription of both upstream and downstream bandwidth. This gives PON 100 yet another advantage over point-to-point networks, in that not only the fiber but also the bandwidth can be shared across a large group of users, without sacrificing security.

Figure 2:
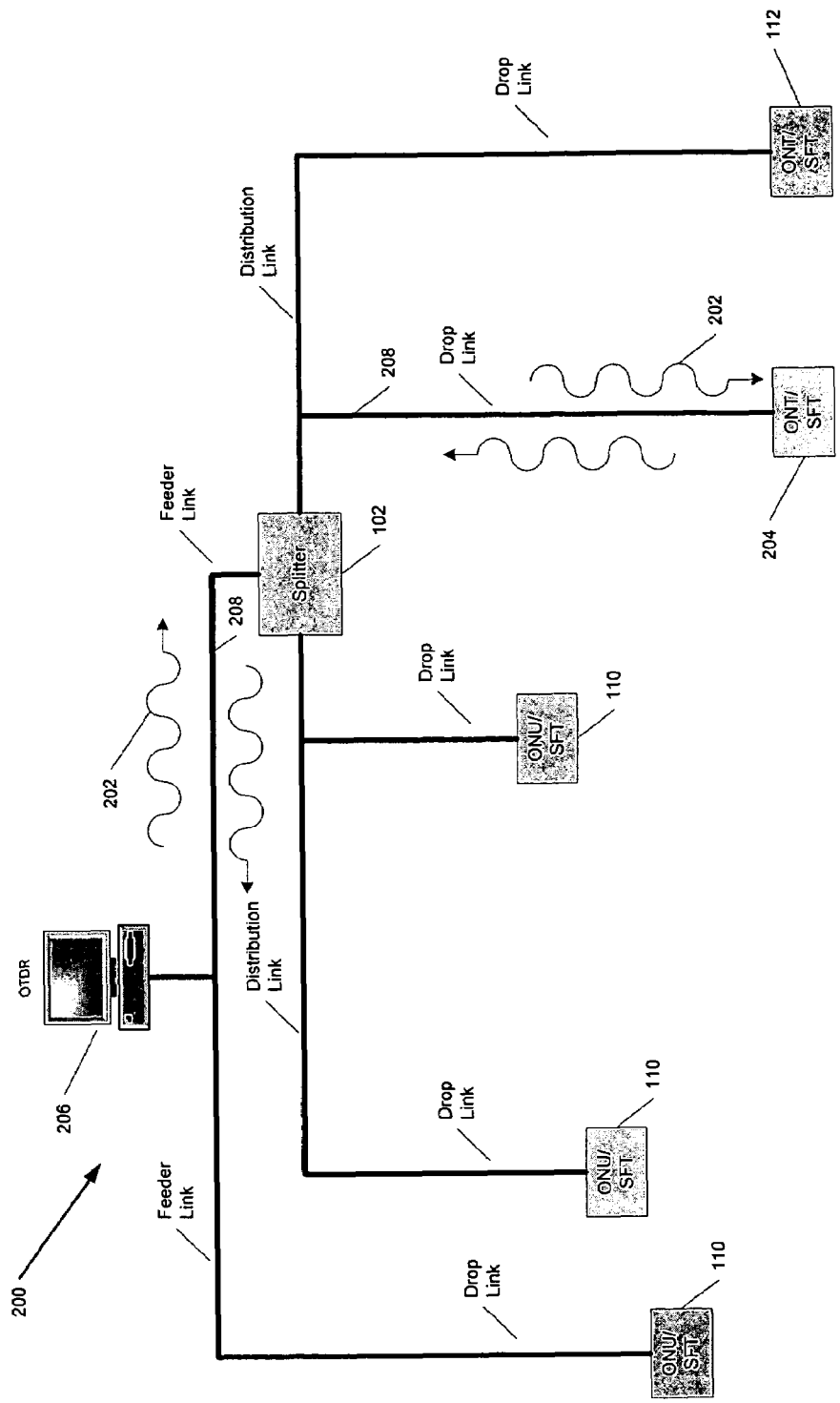
FIG. 2 is an embodiment of a PON according to the present invention for testing the characteristics of the optical network.

FIG. 2 is an embodiment of a PON 200 including facilities for testing the characteristics of the optical network. In FIG. 2, a test signal 202 having a designated wavelength that is addressed to a particular optical network device 204 having a SFT is inserted into the PON 200 by an OTDR 206. The test signal 202 travels downstream through the fiber 208 within the network 200 until it reaches the designated ONT 204. The ONT 204 receives the test signal and separates it from any other voice, video or data signals. The test signal is provided to the SFT associated with the ONT 204, and the SFT responds accordingly. In a preferred embodiment, the EMS of the ONT 204 is directed by the test signal 202 or by a separate signal (not shown in FIG. 2) to activate the SFT such that it reflects the test signal 202 back into the fiber 208 as a response signal 210. The response signal 210 then travels back through the fiber 208 to the OTDR 206 where it is received and analyzed, as is well known. In another embodiment, the SFT electronically reproduces the test signal 202 with a certain degree of fidelity, which is then re-inserted back into the fiber 208 as the response signal 210 and transmitted upstream to the OTDR 206.

Figure 3:
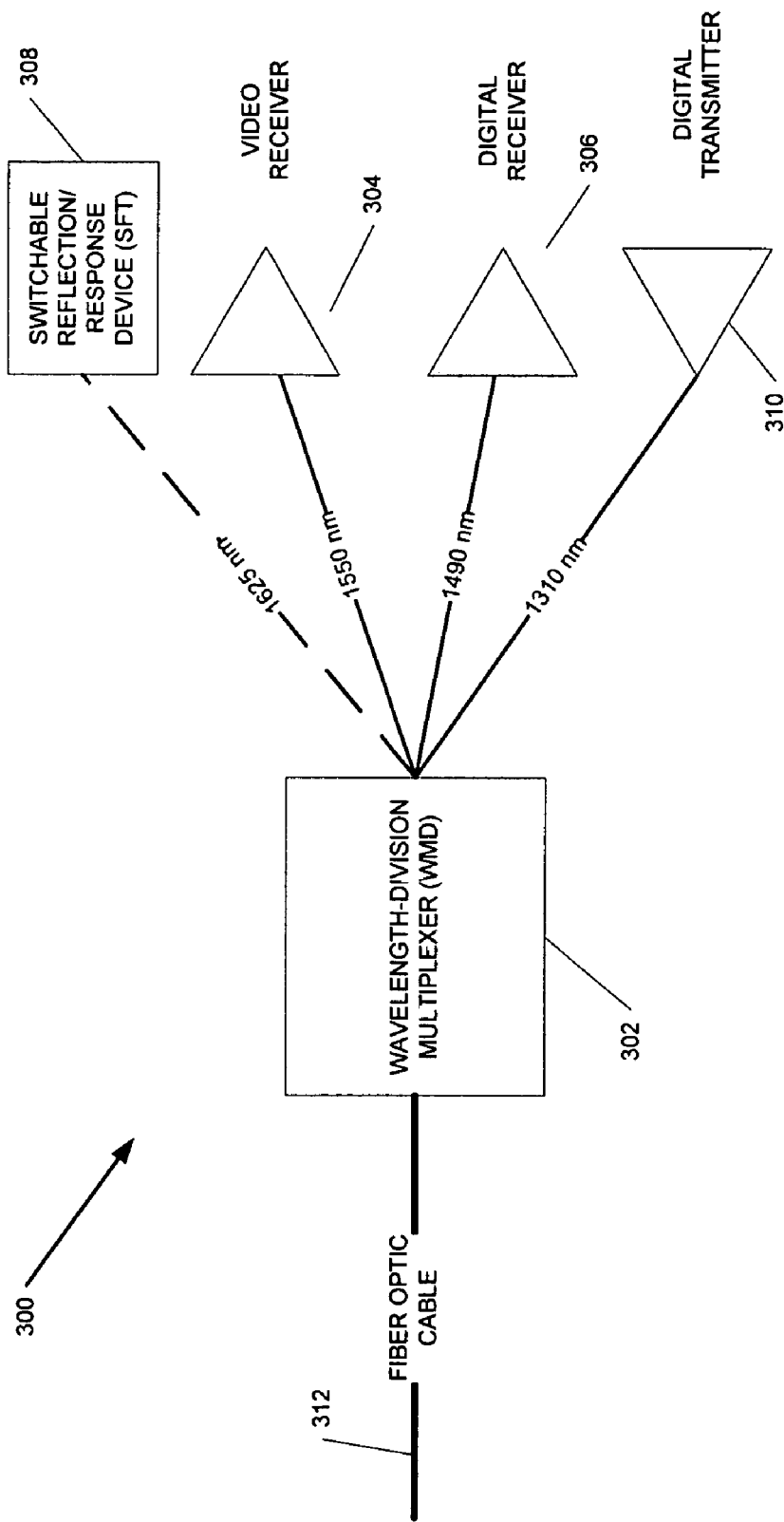
FIG. 3 illustrates an embodiment of an exemplary optical network device that is further comprised of an SFT according to the present invention.

FIG. 3 illustrates an embodiment of an exemplary optical network device 300 that is further comprised of an SFT, according to the present invention. In the embodiment of FIG. 3, a wavelength division multiplexer (WDM) 302 separates a signal based on its wavelength components. For instance, a video signal on the 1550 nm wavelength is separated and provided to a video receiver 304. A digital signal (e.g., Internet protocol) on the 1490 nm wavelength is extracted and provided to a digital receiver 306. According to a preferred embodiment of the present invention, a test signal carried on the 1625 nm wavelength is extracted and provided to a SFT 308. The SFT in turn responds to the test signal by either reflecting the test signal back to the WDM 302, or it reproduces the test signal and transmits the reproduced test signal back to the WDM 302. In this embodiment, the WDM 302 combines the reflected or reproduced test signal with any signals being transmitted at the 1310 nm wavelength by a digital transmitter 310, and sends the combined signal back through the fiber optic cable 312.

In one embodiment, the SFT 308 is activated to respond to the test signal by the optical network device's 300 element manager system ("EMS," not shown), which may communicate with the device 300 via the designated embedded operations channel (also referred to as an overhead channel), as is well known. For example, in normal operation of device 300, the SFT may be deactivated. However, authorized personnel may perform testing on the fiber path to the device 300 by causing the EMS to send messages to the device 300 over the overhead channel to activate the SFT 308 at device 300. After the EMS receives a successful transaction response from the device 300 (e.g., a response message indicating that the SFT 308 has been activated), the EMS will send a message to a network switching element to connect an OTDR to the PON fiber requiring a test, which will then insert, for example, a 1625 nm test wavelength signal. In another embodiment, the SFT 308 may be activated by a portion of the actual test signal received by the optical network device 300. The SFT may be deactivated upon completion of the test via a deactivation message from the EMS or when a timer expires, whichever occurs first.

Figure 4:
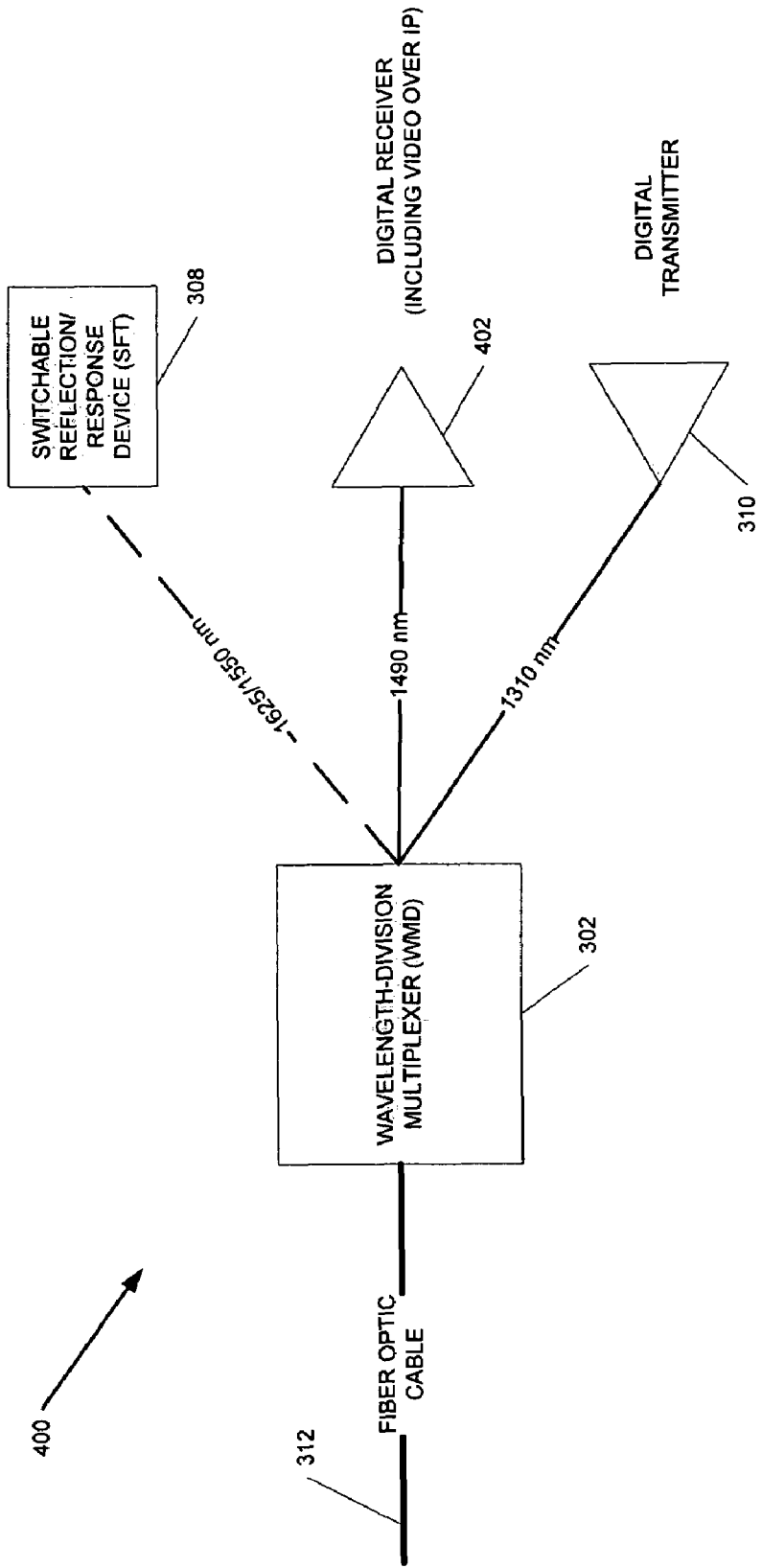
FIG. 4 illustrates another embodiment of an exemplary optical network device that is further comprised of an SFT according to the present invention.

FIG. 4 is similar to FIG. 3; however in this instance the optical network device 400 does not have a separate video receiver. In FIG. 4 video is received by the digital receiver 402 as a video over a packet-data signal (e.g., an Internet Protocol signal). Furthermore, in FIG. 4, because of the "vacant" video channel, the test signal may have different wavelengths such as, for example, 1625 nm or 1550 nm.

Figure 5:
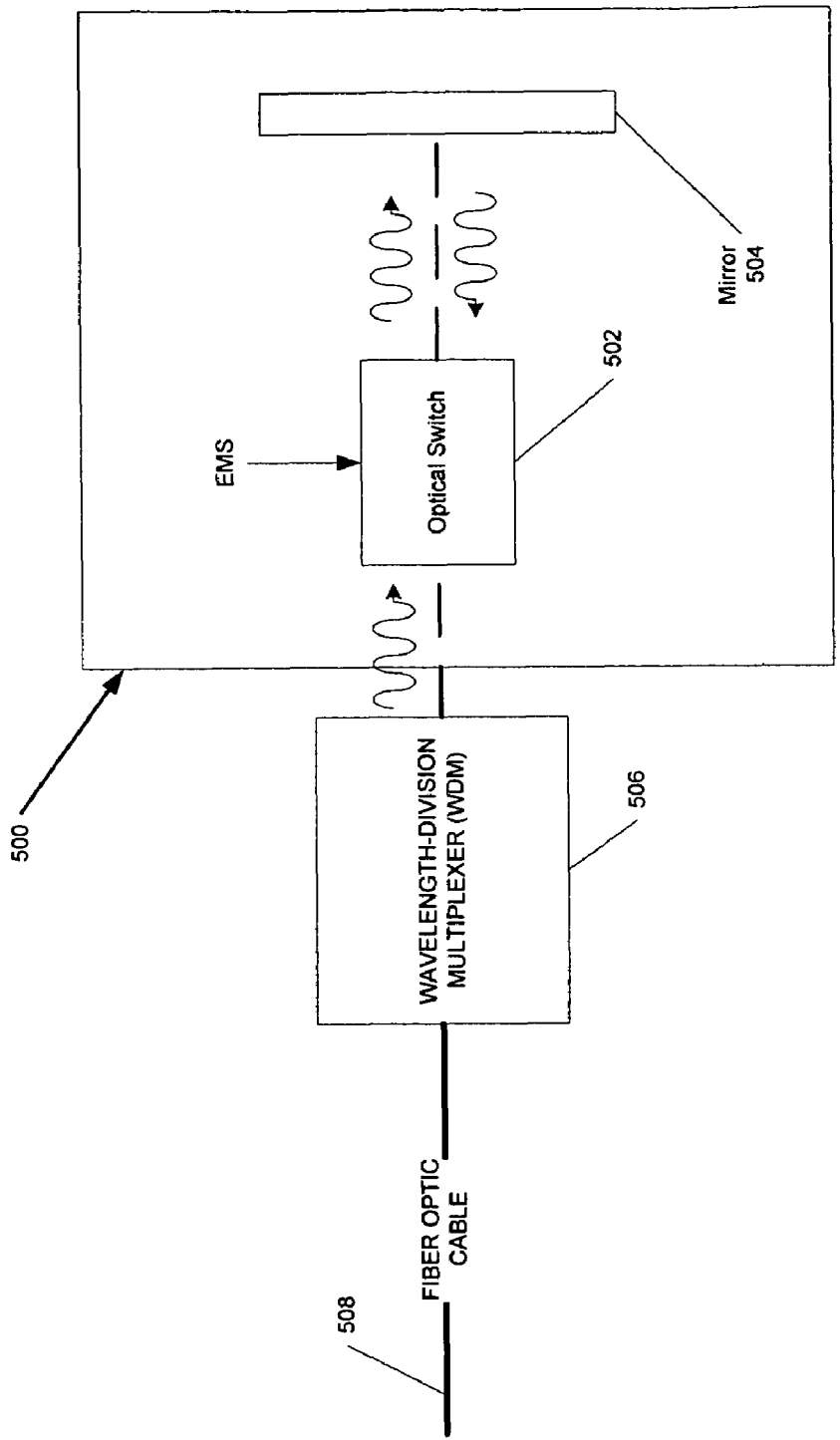
FIG. 5 is an exemplary preferred embodiment of a SFT comprising an optical switch and a mirror according to the present invention.

FIG. 5 is an exemplary preferred embodiment of a SFT 500 comprising an optical switch 502, as are well known in the art, and a mirror 504. One port of the optical switch 502 connects to a WDM 506, and another port terminates at the mirror 504. The WDM 506 directs light of a designated wavelength (e.g., 1625 nm) toward the optical switch 502. The optical switch 502 is activated by a message from the EMS and, in turn, allows the light to pass from the WDM 506 to the mirror 504, where it is reflected back into the fiber 508. When the optical switch 502 is deactivated by the EMS, the light path to the mirror 504 is interrupted. In another embodiment (not shown), the optical switch 502 is omitted and the position of the mirror 504 is mechanically changed in order to provide a reflected light signal back into the fiber 508. In yet another embodiment, the mirror 504 is replaced with an active device so than when activated, light is reflected, but when deactivated, the active device either absorbs the light signal or does not reflect the signal.

Figure 6:
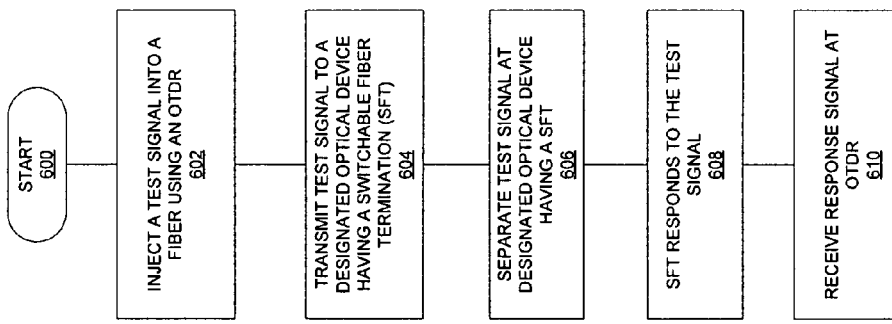
FIG. 6 is an exemplary process of using an optical network device equipped with a SFT to determine characteristics of an optical network and one or more of the components that comprise the network.

FIG. 6 is an exemplary process of using an optical network device equipped with a SFT to determine characteristics of an optical network and one or more of the components that comprise the network. The process starts at step 600. At step 602, a test signal is injected into a fiber using an OTDR. The test signal may include address information that specifies a certain optical network device. At step 604, the test signal is transmitted via the optical network to the designated optical device having an SFT. At step 606, the test signal is separated from any other signal received at the optical network device based on the test signal's carrier wavelength (in this example, 1625 nm). At step 608, the SFT of the optical network device responds to the test signal and a response signal is re-inserted back into the fiber for upstream transmission. The response may take the form of reflecting the test signal, or by electronically or optically reproducing the test signal. At step 610, the response signal is received at the OTDR, and transmission metrics are measured. The process ends at step 612.

Figure 7:
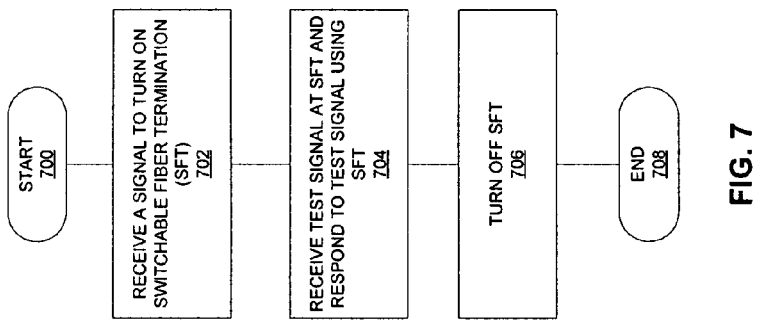
FIG. 7 shows an exemplary process for a SFT according to an embodiment of the invention.

FIG. 7 shows an exemplary process for a SFT according to an embodiment of the invention. The process starts at step 700. At step 702, a signal is received at an optical network device having an SFT. This signal activates or turns on the SFT. Once the SFT is activated, the process goes to step 704 where a test signal is received at the SFT and the SFT responds to the test signal. (Note that steps 702 and 704 may be simultaneous—the test signal may contain a signal to activate the SFT.) This response may be in the form of a reflection of the test signal, or a reproduction of the test signal. At step 706, the SFT is turned off or deactivated. This may occur as a time-out function or be triggered by the SFT responding to the test signal. The SFT may also be deactivated by another signal sent to the optical network device that utilizes the SFT. The process ends at step 708.

Figure 8:
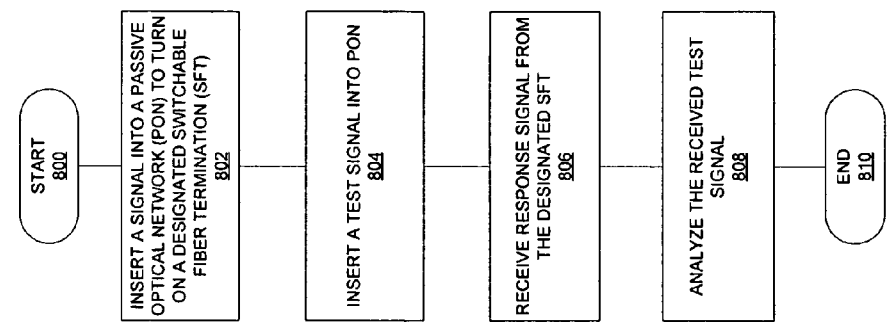
FIG. 8 describes an exemplary process for determining characteristics and the status of an optical network and one or more of the components that comprise the optical network according to an embodiment of the present invention.

FIG. 8 describes an exemplary process for determining characteristics and the status of an optical network and one or more of the components that comprise the optical network according to an embodiment of the present invention. The process starts at step 800. At step 802 a signal is inserted into an optical network to activate a designated SFT. At step 804, a test signal is inserted into the optical network. (Note that steps 802 and 804 may be simultaneous—the test signal may contain a signal to activate the SFT.) At step 806, a response signal that originated from the designated SFT is received. This response signal may be a reflection or a reproduction of the test signal. At step 808, the response signal is analyzed to determine the characteristics and the status of an optical network and one or more of the components that comprise the optical network. The process ends at step 810.

Many modifications and other embodiments will come to mind as a result of the teachings presented in the foregoing descriptions of the preferred embodiments. Accordingly, it should be understood that the invention is not to be limited to the specific embodiments described herein, but rather to the appended claims, and that modifications and other embodiments are intended to be included within the scope of the appended claims. Although specific terms are employed herein, they are used in an inclusively descriptive sense only and not for purposes of limitation.

The invention claimed is:

1. A fiber-optic network comprised of:
one or more optical network devices;
a central office comprised of an optical line termination capable of sending and receiving optical signals of one or more wavelengths; and
fiber optic cable that connects the one or more optical devices to the central office,
wherein at least one of said one or more optical devices include a switchable fiber termination (SFT) that is configured to be turned on by a signal from said optical line termination and said SFT is configured to respond to a test signal sent to said SFT through said fiber optic cable by said optical line termination,
wherein said SFT is comprised of a switchable mirror and said SFT responds to said test signal by reflecting said test signal back into said fiber optic cable.

2. The fiber optic network of claim 1, wherein said optical network device is comprised of one or more of an optical network terminal, an optical network unit, and an optical splitter.

3. The fiber optic network of claim 1, wherein said optical line termination includes an optical time-domain reflectometer (OTDR).

4. The fiber optic network of claim 1, wherein said test signal has a wavelength of 1625 nanometers.

5. The fiber optic network of claim 1, wherein said SFT receives said test signal, reproduces it, and re-injects the reproduced test signal back into said fiber optic cable.

6. An optical network terminal (ONT) comprising:
at least one wavelength division multiplexer connected to a fiber optic cable;
at least one digital receiver;
at least one digital transmitter; and
a switchable fiber termination (SFT), wherein said SFT is configured to be activated by a signal received by said ONT and said wavelength division multiplexer receives an optical signal comprised of one or more signals having discrete wavelengths and separates said optical signal into at least a test signal and a digital signal and said switchable fiber termination receives said test signal and responds with a response signal,
wherein said SFT includes a switchable mirror and said response signal comprises said test signal reflected back into said fiber optic cable.

7. The ONT of claim 6, wherein said test signal has a wavelength of 1625 nanometers and said digital signal has a wavelength of 1490 nanometers.

8. The ONT of claim 6, wherein said SFT receives said test signal, reproduces it as said response signal, and re-injects the response signal back into said fiber optic cable.

9. The ONT of claim 6, wherein said digital receiver receives a signal that has a wavelength of 1490 nanometers and includes video over Internet Protocol data.

10. The ONT of claim 6 further comprising a video receiver that receives a video signal from the wavelength-division multiplexer that has a wavelength of 1550 nanometers.

11. A method of testing a fiber-optic network while said network carries data, comprising:
injecting a signal into a fiber optic cable, wherein said signal is comprised of a test signal having a first wavelength and data signal having a second wavelength;
transmitting said signal through said fiber optic network to an optical device having a switchable fiber termination;
separating said test signal from said data signal at said optical device and routing said test signal to said switchable fiber termination, wherein said switchable fiber termination responds to said test signal by re-inserting a response signal back into the fiber optic cable; and
receiving and analyzing said response signal,
wherein said switchable fiber termination includes a switchable mirror and responds to said test signal by reflecting said test signal back into the fiber optic cable to form the response signal.

12. The method of claim 11, wherein said switchable fiber termination responds to said test signal by reproducing said test signal as said response signal, and re-injecting the response signal back into said fiber optic cable.

13. The method of claim 11, wherein injecting a signal into a fiber optic cable is performed using an optical time-domain reflectometer (OTDR).

14. The method of claim 11, wherein receiving and analyzing said response signal is performed using an optical time-domain reflectometer (OTDR).

15. The method of claim 11, wherein separating said test signal from said data signal at said optical device is performed using a wavelength-division multiplexer.

16. The method of claim 11, wherein said first wavelength is one of 1550 or 1625 nanometers.

17. The method of claim 16, wherein the second wavelength is 1490 nanometers.

18. A method of using an optical network device equipped with a switchable fiber termination (SFT) to test an optical network actively carrying data, comprising:
receiving from the optical network a optical signal at said optical network device, the signal including an SFT activation message;
activating the SFT as a result of receiving the SFT activation message;
receiving an optical test signal at the SFT;
sending a response signal from the SFT in response to said optical test signal to the optical network; and
deactivating said SFT,
wherein said SFT comprises a switchable mirror,
wherein sending a response signal includes reflecting said optical test signal back into the optical network to form the response signal.

19. The method of claim 18, wherein said optical signal includes the SFT activation message and the optical test signal.

20. The method of claim 18, wherein sending a response signal includes reproducing said optical test signal and injecting the reproduced optical test signal back into said optical network to form the response signal.

21. The method of claim 18, wherein said optical test signal has a wavelength of one of 1550 nanometers or 1625 nanometers.

* * * * *